United States Patent
Bostick et al.

(10) Patent No.: US 9,521,254 B2
(45) Date of Patent: Dec. 13, 2016

(54) COMMUNICATING AVAILABILITY OF A MOBILE DEVICE

(71) Applicant: International Business Machines Corporation, Armonk, NY (US)

(72) Inventors: James E. Bostick, Cedar Park, TX (US); John M. Ganci, Jr., Cary, NC (US); Ji Young Roe, Northbrook, IL (US); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/456,144

(22) Filed: Aug. 11, 2014

(65) Prior Publication Data
US 2016/0044167 A1     Feb. 11, 2016

(51) Int. Cl.
*H04M 1/66* (2006.01)
*H04M 3/42* (2006.01)
(Continued)

(52) U.S. Cl.
CPC .......... *H04M 3/42365* (2013.01); *H04W 4/12* (2013.01); *H04W 4/16* (2013.01);
(Continued)

(58) Field of Classification Search
CPC ...... H04L 67/24; H04L 5/0058; H04L 12/581; H04L 65/1096; H04L 43/04; H04L 67/142; H04L 67/148; H04L 67/306; H04L 67/22; H04W 12/06; H04W 48/08; H04W 52/0216; H04W 56/002; H04W 48/02
See application file for complete search history.

(56) References Cited

U.S. PATENT DOCUMENTS 7,474,744 B2    1/2009   Janssen
8,577,393 B2   11/2013   Hung et al.
(Continued)

FOREIGN PATENT DOCUMENTS

CN      101202983 A    6/2008
CN      200610162000   6/2008
(Continued)

OTHER PUBLICATIONS

Siemens AG, et al., "Provide Time Zone Information before Call Initiation", IPCOM000158566D, Oct. 24, 2007, 3 pages.

*Primary Examiner* — Kwasi Karikari
(74) *Attorney, Agent, or Firm* — Maeve M. Carpenter; Maxine L. Barasch; Keohane & D'Alessandro PLLC

(57) ABSTRACT

Embodiments described herein provide approaches for communicating availability of a mobile device. Specifically, at least one approach includes: determining a current status of a mobile device operated by a receiving user, the current status including an operating state and an operating time zone; and providing the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device. Based on the current status, a warning can be communicated to the sender indicating that is inadvisable to continue with the communication, as the receiving user is unlikely to be available and/or willing to respond.

17 Claims, 5 Drawing Sheets

(51) Int. Cl.
  *H04W 4/16* (2009.01)
  *H04W 12/06* (2009.01)
  *H04W 4/12* (2009.01)
  *H04M 3/436* (2006.01)

(52) U.S. Cl.
  CPC ............ *H04W 12/06* (2013.01); *H04M 3/436* (2013.01); *H04M 2203/2072* (2013.01); *H04M 2242/14* (2013.01)

(56) References Cited

U.S. PATENT DOCUMENTS

| | | | |
|---|---|---|---|
| 8,583,079 B2 | 11/2013 | Chawla | |
| 8,666,043 B2 | 3/2014 | Ray | |
| 2002/0168987 A1* | 11/2002 | Wang | H04M 3/436 455/456.1 |
| 2005/0070282 A1* | 3/2005 | Hinz | H04W 4/16 455/435.1 |
| 2006/0099940 A1 | 5/2006 | Pfleging et al. | |
| 2006/0286970 A1 | 12/2006 | Otobe et al. | |
| 2007/0088839 A1 | 4/2007 | Yoakum | |
| 2010/0205242 A1* | 8/2010 | Marchioro, II | G06Q 10/10 709/203 |
| 2013/0217364 A1 | 8/2013 | Varoglu et al. | |
| 2013/0275516 A1* | 10/2013 | Grant | H04M 1/72569 709/206 |
| 2015/0172441 A1* | 6/2015 | Samhat | H04M 1/72563 455/418 |

FOREIGN PATENT DOCUMENTS

| | | |
|---|---|---|
| CN | 102769700 A | 11/2012 |
| CN | 201210232158 | 11/2012 |
| JP | 2002171334 A | 6/2002 |
| WO | 2010138164 A1 | 12/2010 |

* cited by examiner

COMMUNICATING AVAILABILITY OF A MOBILE DEVICE

BACKGROUND

1. Field of the Invention

This invention relates generally to mobile device availability detection and, more specifically, to determining and relaying availability of a mobile device user.

2. Description of the Related Art

Mobile devices are becoming ubiquitous. People carry them to meetings, use them out of the office, in social situations, and in other settings where wireless communication is needed. Incoming voice calls to mobile devices can be intrusive under certain situations. It is therefore desirable to allow callees (e.g., a receiving user) to screen calls and decide in advance whether the calls warrant answering. Caller ID service is conventionally available to provide a callee with limited information about a call for call screening purposes, with the callee usually having very few options to manage the call. In particular, for most callees, the only available actions are to accept the call or decline it by either not answering or allowing an answering machine or voice mail system to respond. The caller in such cases has no control over whether or not the call will be accepted.

More advanced Caller ID services can provide the callee with limited interaction with the caller to assist the call screening process, thereby giving both the caller and the callee more control over the call. However, despite the limited interaction, the caller still has no effective way of knowing when the callee is willing to accept their call.

Currently there are models and mechanisms, such as those defined by the presence and availability management (PAM) standards, that provide APIs a caller's mobile application software can use to check for the availability of a callee. However, the presence status in such services has typically been limited to a user specifying his/her availability status by manually selecting options such as online, busy, away, etc. Further, presence status in such services is often made accessible only to users within that service.

SUMMARY

In general, embodiments described herein provide approaches for communicating availability of a mobile device. Specifically, at least one approach includes: determining a current status of a mobile device operated by a receiving user, the current status including an operating state and an operating time zone; and providing the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device. Based on the current status, a warning can be communicated to the sender indicating that is inadvisable to continue with the communication, as the receiving user is unlikely to be available and/or willing to respond. In this way, the receiving user can better avoid unwelcomed calls, pings, messages indicators, etc., occurring at times when he/she is unavailable due to changes in location, meetings, travel, and the like. In another approach, the receiving user has the capability for his/her phone to be powered "off", yet retain the ability to receive calls from emergency services and senders who provide an emergency passcode and/or are on a list of pre-approved callers.

One aspect of the present invention includes a method for communicating availability of a mobile device, the method comprising the computer-implemented steps of: determining a current status of a mobile device operated by a receiving user, the current status including an operating state and an operating time zone; and providing the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device.

Another aspect of the present invention provides a system for communicating availability of a mobile device, the system comprising: a memory medium comprising program instructions; a bus coupled to the memory medium; and a processor, for executing the program instructions, coupled to an availability detector via the bus that when executing the program instructions causes the system to: determine a current status of a mobile device operated by a receiving user, the current status including an operating state and an operating time zone; and provide the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device.

Another aspect of the present invention provides a computer program product for communicating availability of a mobile device, the computer program product comprising a computer readable storage medium, and program instructions stored on the computer readable storage medium, to: determine a current status of a mobile device operated by a receiving user, the current status including an operating state and an operating time zone; and provide the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device.

BRIEF DESCRIPTION OF THE SEVERAL VIEWS OF THE DRAWINGS

The accompanying drawings, which are incorporated in and constitute a part of this specification, illustrate several embodiments of the present teachings and, together with the description, serve to explain the principles of the present teachings.

Often, similar elements may be referred to by similar numbers in various figures (FIGs) of the drawing, in which case typically the last two significant digits may be the same. Furthermore, for clarity, some reference numbers may be omitted in certain drawings, in which.

Figure 1:
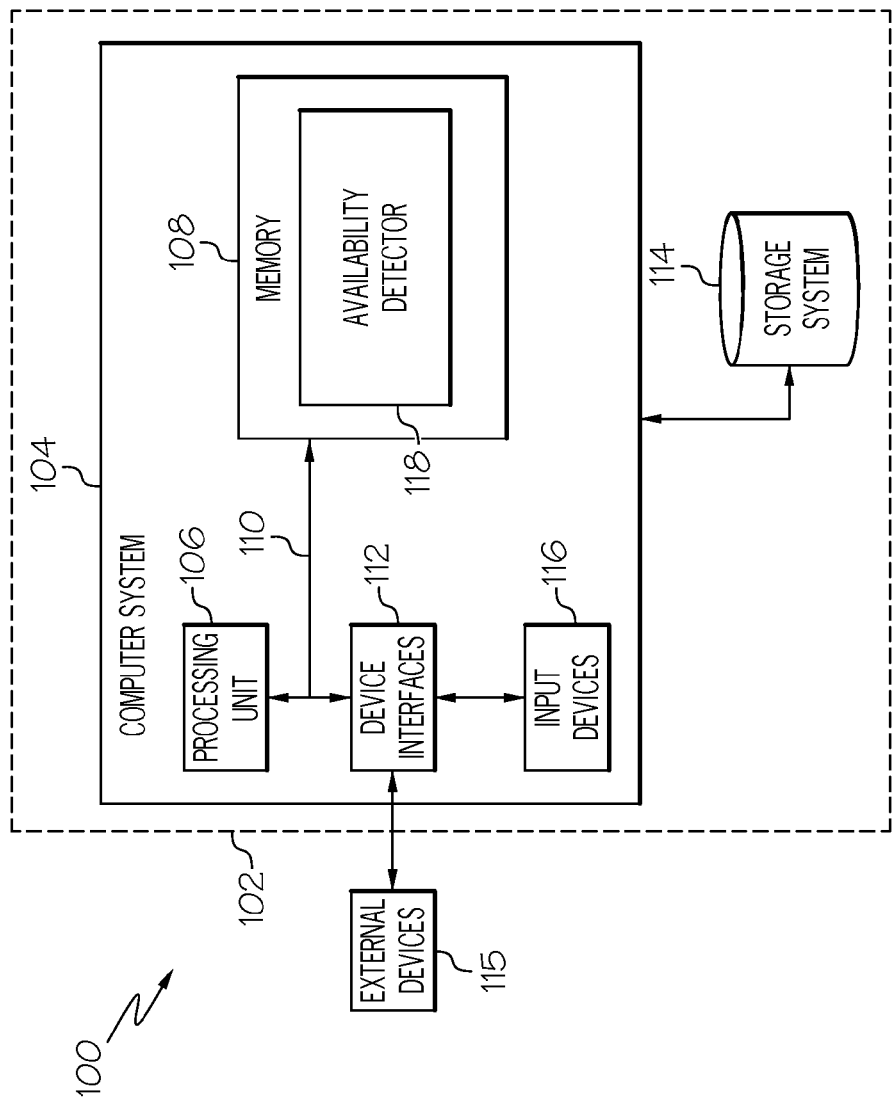
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for communicating availability of a mobile device. Specifically, at least one approach includes: determining a current status of a mobile device operated by a receiving user, the current status including an operating state and an operating time zone; and providing the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device. Based on the current status, a warning can be communicated to the sender indicating that is inadvisable to continue with the communication, as the receiving user is unlikely to be available and/or willing to respond. In this way, the receiving user can better avoid unwelcomed calls, pings and messages indicators occurring at times when he/she is unavailable due to changes in location, meetings, travel, etc. In another approach, the receiving user has the capability for his/her phone to be powered "off", yet retain the ability to receive calls from emergency services and senders who provide an emergency passcode and/or are on a list of pre-approved callers.

Referring now to FIG. 1, a computerized implementation 100 of an exemplary embodiment will be shown and described. As depicted, implementation 100 includes computer system 104 deployed within a computer infrastructure, such as a mobile device 102. This is intended to demonstrate, among other things, that the present invention could be implemented within a network environment (e.g., the Internet, a wide area network (WAN), a local area network (LAN), a virtual private network (VPN), etc.), a cloud-computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, mobile device 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for communicating availability to mobile device 102. It should be understood that any other computers implemented under the present invention may have different components/software, but will perform similar functions. As shown, computer system 104 includes a processing unit 106 capable of communicating with an availability detector 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115, input devices 116, and availability detector 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating availability detector 118, which is stored in memory 108 and/or storage system 114. While executing computer program code, processing unit 106 can read and/or write data to/from memory 108, storage system 114, and availability detector 118. Storage system 114 can include VCRs, DVRs, RAID arrays, USB hard drives, optical disk recorders, flash storage devices, and/or any other data processing and storage elements for storing and/or processing data.

Figure 2:
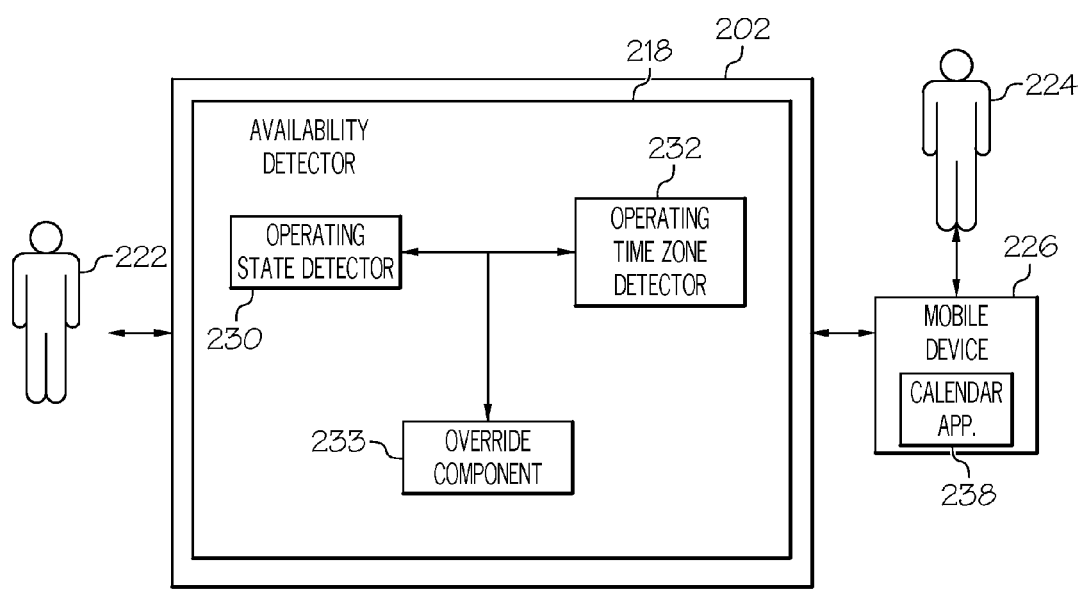
FIG. 2 shows a more detailed view of an availability detector for communicating availability of a mobile device according to illustrative embodiments.

Referring now to FIG. 2, the structure and operation of mobile device 202 and availability detector 218, which together are capable of detecting and communicating availability of one or more additional mobile devices, will be described in greater detail. As shown, mobile device 202 is operated by a sending user 222 for the purpose of communicating with one or more additional users 224 each associated with his/her own mobile device(s) 226. In various embodiments, mobile device 202 may include, without limitation, a mobile computing device, a smart phone, a telephone, a digital telephone, a cellular telephone, eBook readers, a personal digital assistant (PDA), a handset, an ultra-mobile device, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

During use, availability detector 218 is configured to determine a current status of mobile device 226 operated by receiving user 224. In an exemplary embodiment, the current status includes an operating state (e.g., mobile device 226 is on and available, on and unavailable, on and in silent mode, off, do not disturb (DND) mode, etc.) and an operating time zone, as determined an operating state detector 230 and an operating time zone detector 232, respectively. In another embodiment, operating state detector 230 communicates with a calendar application 238 operating on mobile device 226 to assist in determining availability and, thus, operating state.

Figure 3:
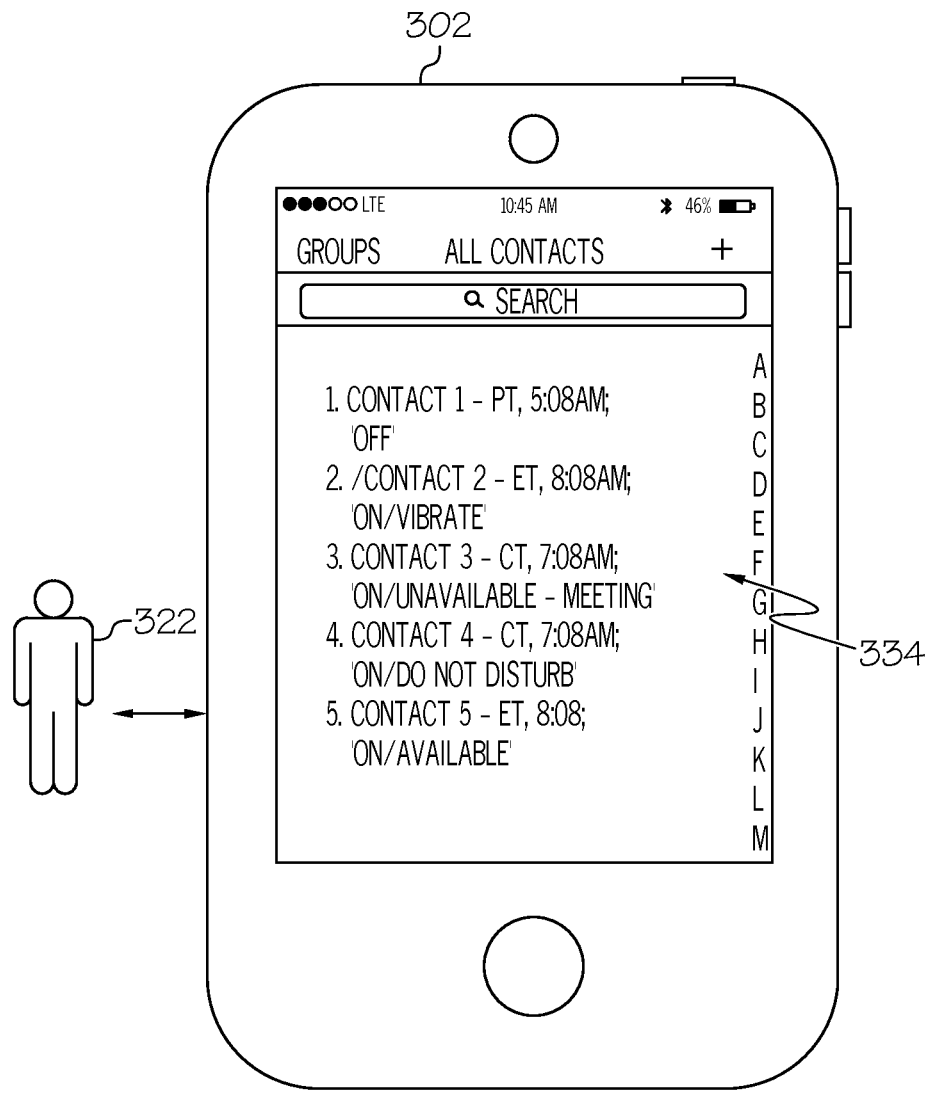
FIG. 3 shows an exemplary mobile device according to illustrative embodiments.

In one approach, availability detector 218 is configured to provide the current status of mobile device 226 to sender 222 via the sender's mobile device 202 by annotating a contact list with visual data (e.g., textual information) indicating the operating state and the operating time zone of mobile device 226, as shown in FIG. 3. In this embodiment, displayed next to each contact within contact list 334 stored in mobile device 302 is a current time and time zone in which each contact's corresponding mobile device is currently operating. Contact list 334 is dynamically updateable, and lists the actual time for each contact at the moment (as opposed to the current time of sender 322). As a result, sender 322 is able to easily see each contact's likely availability, and use this to gauge whether a communication (e.g., a telephone call, text message, email message, instant message, and the like) is desired/necessary based on how likely it is to elicit a response from the intended contact. Various location services (e.g., global positioning device, cellular tower based positioning) can be used to determine each contact's current time zone/time.

In order to populate contact list 334 with the dynamic, current status information, prior permission is granted by each contact to allow access by mobile device 302. Along these lines, a communication connection (e.g., an IP based communication) can be established whereby 2-way communication between respective mobile devices is provided. Periodically, as configured by sender 322, operating time zone detector 232 (FIG. 2) can query all mobile devices operated by each contact in order to find out the current time zone (and therefore time).

As further shown in FIG. 3 an indicator of the current operating state of each contact's phone is shown along with each listed contact. This may require a sharing mechanism on the contacts' side that indicates a mobile device is in silent mode, off, available, etc. In some cases the particular contact may not want others to know he/she is away from home, as indicated by the different time zone. Therefore, a configurable security clearance option can be included to allow each contact to select a group of people (e.g., a subset of his/her contacts) for which this information becomes available.

Figure 4:
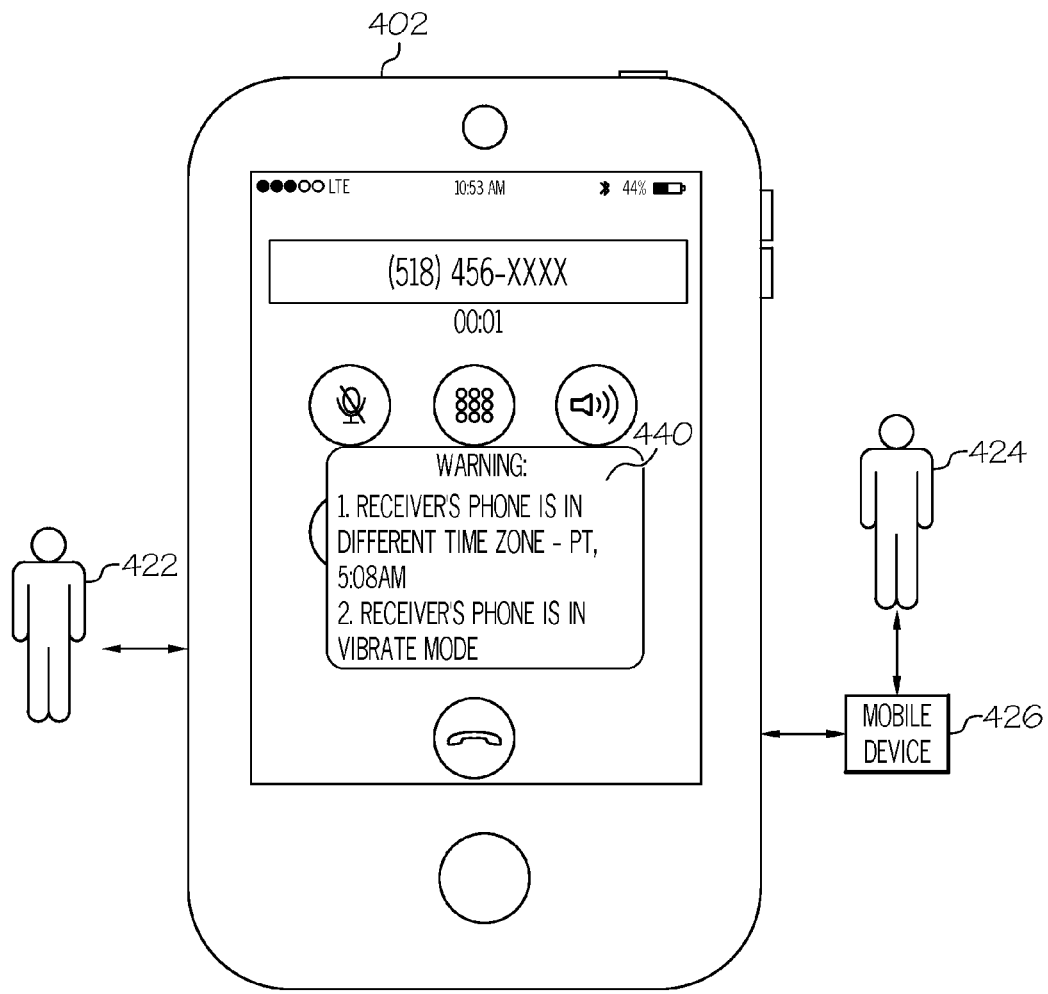
FIG. 4 shows an exemplary mobile device according to illustrative embodiments.

In another approach, as shown in FIG. 4, availability detector 218 (FIG. 2) is configured to generate a graphic 440 indicating the operating state (e.g., "receiver's phone is in vibrate mode") and the operating time zone (e.g., "PT, 5:08 AM") of mobile device 426 when sender 422 initiates communication with mobile device 426, which in this case is operated by a receiving user 424 not currently included/known within the contact list of mobile device 402. In the example shown, graphic 440 is a pop-up notification used to warn sender 422 that communication with mobile device 426 is inadvisable based on the current status of mobile device 426. Sender 422, who in this case is located in New York, N.Y. (i.e., ET), can recognize that receiving user is most likely asleep/unreceptive to a communication given that it is 5:08 AM where receiving user 424 currently is located. Sender 422 can then choose whether to proceed or not with the communication in light of this information.

Referring again to FIG. 2, an approach is provided for allowing communication with a mobile device, even if the mobile device appears "off", if certain conditions are met. In this embodiment, we assume that mobile device 202 is either powered off, or in a do not disturb (DND) mode. Other users may attempt to contact user 222, who is a receiving user in this case. Mobile device 202 can be activated into an "on" state by particular callers or by a particular sequence of events using an override component 233 of availability detector 218. In one approach, user 222 can specify those persons who are able to activate mobile device 202, e.g., with or without first inputting a passcode when prompted. In another approach, capability would exist to grant this permission to a group of people, as recognized by inclusion within a contact list, or based on membership to a pre-specified set of permitted senders.

The mechanism used to turn on mobile device 202 may originate from the device's emergency services capability. For example, a Commercial Mobile Alerts System (CMAS) keeps WEA-enabled devices informed in the event of an emergency. There are currently three common types of WEA communications-Presidential Alerts, Imminent Threat, and AMBER Alerts. Override component 233 is capable of handling these WEA communications, as well as a novel alert type introduced herein that, when received by mobile device 202, triggers an appropriate voltage spike to turn "on" mobile device 202. In the case that a passcode is required to enable this function, the voltage is increased after comparing the passcode transmitted with the emergency message alert type against the security settings used to enable this feature on mobile device 202. Use of a passcode and routing telephone number allows the service to be sent to one or more phones, whereas in conventional WEA alert systems, all devices within an area are contacted without discretion. In another embodiment, access to this service may require a password to initiate the sending of the alert to a specific mobile device in order to identify that the incoming request comes from an individual user who has entered the emergency pass code supplied by user 222.

Once powered "on," a call, message, alert, etc., is transferred to mobile device 202. As such, a configured set of people, including an optional inclusion of a government entity, would have the capability to communicate with mobile device 202, wherein the communication may have a distinct sound/ring tone. In another embodiment, the communication may include an emergency ring tone, which overrides a silent/vibrate mode of mobile device 202.

In another embodiment, a governmental/safety organization, in collusion with a corresponding mobile device service provider, would be provided the capability to wake up all phones in the area to broadcast a message. Emergency services, e.g., would automatically be added to the list/group that could change the operating state of mobile device 224. This is useful in case of weather warnings, terror attacks, local amber alerts, etc. Those calls deemed to be non-emergency, i.e., those incoming calls that do not originate from pre-configured set of people, or those incoming calls communicated without a proper passcode, go directly to voicemail, just as they would when mobile device 224 is powered off.

Once the communication is sent to mobile device 202 and received by user 222, as acknowledged by any number of known mechanisms, mobile device 202 is returned to its previous operating state, e.g., "off" or in DND mode. Optionally, mobile device 202 can stay in an active state, either indefinitely or for a pre-determined period of time. Furthermore, in the case that the communication is considered an emergency, override component 233 may prevent mobile device 202 from retuning to its previous operating state until user 202 affirmatively responds to the communication (e.g., by answering the phone call, tapping the screen where indicated, or providing a reply text message).

It can be appreciated that the approaches disclosed herein can be used within a computer system to communicate availability of a mobile device. In this case, as shown in FIGS. 1-2, the availability detector can be provided, and one or more systems for performing the processes described in the invention can be obtained and deployed to mobile device 102 (FIG. 1). To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
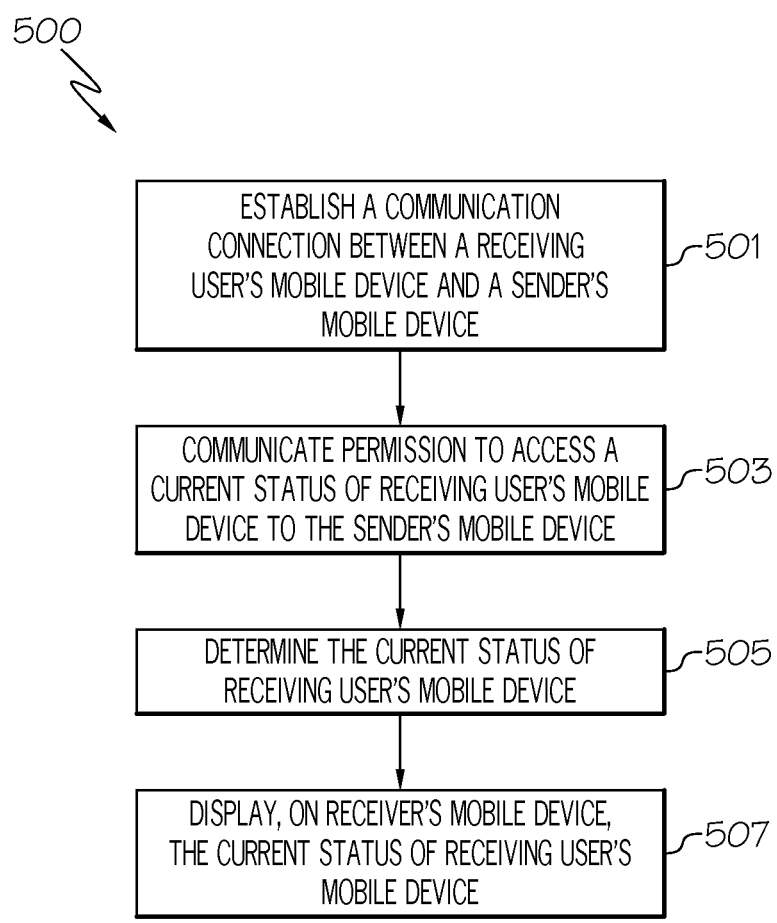
FIG. 5 shows a process flow for communicating availability of a mobile device according to illustrative embodiments.

As depicted in FIG. 5, a system (e.g., computer system 104) carries out the methodologies disclosed herein. Shown is a process flow 500 for communicating availability of a mobile device. At 501, a communication connection is established between a receiving user's mobile device and a sender's mobile device. At 503, permission to access a current status of receiving user's mobile device is communicated to the sender's mobile device. At 505, the current status of receiving user's mobile device is determined, wherein the current status includes an operating state and an operating time/time zone. At 507, the current status of receiver's mobile device is displayed on sender's mobile device.

Process flow 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for communicating availability of a mobile device. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for communicating availability of a mobile device, the method comprising the computer-implemented steps of:
    determining a current status of a mobile device operated by a receiving user, the current status including an operating state and an operating time zone; and
    providing the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device,
    wherein the graphic comprises a pop-up message generated if the receiving user is not currently included within the contact list.

2. The method according to claim 1, further comprising communicating a warning to the sender indicating that communication with the mobile device is inadvisable based on the current status of the mobile device.

3. The method according to claim 1, further comprising establishing a communication connection between the mobile device and the sender's mobile device.

4. The method according to claim 1, further comprising receiving permission from the mobile device to provide the current status to the sender via the sender's mobile device.

5. The method according to claim 1, the operating state including one of: on and available, on and unavailable, on and in silent mode, off, and do not disturb (DND) mode.

6. The method according to claim 5, further comprising allowing communication with the mobile device in the case that the mobile device has an operating state indicating the mobile device is off or in DND mode, the communication being allowed when either of the following conditions is met: the sender provides an acceptable password in response to a security prompt, and the sender is a member of a set of permitted senders.

7. The method according to claim 6, the allowing communication further comprising changing the operating state of the mobile device.

8. A system for communicating availability of a mobile device, the system comprising:
    a memory medium comprising program instructions;
    a bus coupled to the memory medium; and
    a processor, for executing the program instructions, coupled to an availability detector via the bus that when executing the program instructions causes the system to:
        determine a current status of a mobile device operated by a receiving user, the current status including an operating state and an operating time zone; and
        provide the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device,
        wherein the graphic comprises a pop-up message generated if the receiving user is not currently included within the contact list.

9. The system according to claim 8, further comprising program instructions causing the system to communicate a warning to the sender indicating that communication with the mobile device is inadvisable based on the current status of the mobile device.

10. The method according to claim 8, further comprising program instructions causing the system to:
    establish a communication connection between the mobile device and the sender's mobile device; and
    receive permission from the mobile device to provide the current status to the sender via the sender's mobile device.

11. The method according to claim 8, the operating state including one of: on and available, on and unavailable, on and in silent mode, off, and do not disturb (DND) mode.

12. The method according to claim 8, further comprising program instructions causing the system to allow communication with the mobile device in the case that the mobile device has an operating state indicating the mobile device is off or in DND mode, the communication being allowed when either of the following conditions is met: the sender provides an acceptable password in response to a security prompt, and the sender is a member of a set of permitted senders.

13. The method according to claim 12, the program instructions causing the system to allow communication with the mobile device further causing the system to change the operating state of the mobile device.

14. A computer program product for communicating availability of a mobile device, the computer program product comprising a computer readable storage device, and program instructions stored on the computer readable storage device, to:
    determine a current status of a mobile device operated by a receiving user, the current status including an operating state and an operating time zone; and
    provide the current status of the mobile device to a sender via the sender's mobile device by performing either of the following: annotating a contact list with visual data indicating the operating state and the operating time zone of the mobile device, and generating a graphic indicating the operating state and the operating time zone of the mobile device when the sender initiates communication with the mobile device,
    wherein the graphic comprises a pop-up message generated if the receiving user is not currently included within the contact list.

15. The computer program product of claim 14, the computer readable storage device further comprising program instructions to communicate a warning to the sender indicating that communication with the mobile device is inadvisable based on the current status of the mobile device.

16. The computer program product of claim 14, the computer readable storage device further comprising program instructions to:

establish a communication connection between the mobile device and the sender's mobile device; and receive permission from the mobile device to provide the current status to the sender via the sender's mobile device.

17. The computer program product of claim 14, the computer readable storage device further comprising program instructions to allow communication with the mobile device in the case that the mobile device has an operating state indicating the mobile device is off or in DND mode, the communication being allowed when either of the following conditions is met: the sender provides an acceptable password in response to a security prompt, and the sender is a member of a set of permitted senders.

* * * * *